United States Patent
Hayot et al.

(10) Patent No.: US 7,099,772 B2
(45) Date of Patent: Aug. 29, 2006

(54) ROUTE DETERMINATION METHOD AND DEVICE

(75) Inventors: Pierre Hayot, Clamart (FR); Michel Raynaud, Fontenay-Sous-Bois (FR)

(73) Assignee: Societe de Technologie Michelin, Clermont-Ferrand (FR)

(*) Notice: Subject to any disclaimer, the term of this patent is extended or adjusted under 35 U.S.C. 154(b) by 0 days.

(21) Appl. No.: 10/868,026

(22) Filed: Jun. 16, 2004

(65) Prior Publication Data

US 2005/0010358 A1   Jan. 13, 2005

Related U.S. Application Data

(63) Continuation of application No. PCT/EP02/14396, filed on Dec. 17, 2002.

(30) Foreign Application Priority Data

Dec. 17, 2001  (FR)  .................................. 01 16627

(51) Int. Cl.
*G01C 21/34* (2006.01)
*G08G 1/0969* (2006.01)

(52) U.S. Cl. ...................... 701/202; 701/201; 701/209; 340/995.19; 340/995.23

(58) Field of Classification Search ................ 701/202, 701/201, 203, 204, 208, 209, 210, 211; 340/995.18, 340/995.19, 995.23, 995.24
See application file for complete search history.

(56) References Cited

U.S. PATENT DOCUMENTS 5,502,640 A * 3/1996 Yagyu et al. ............... 701/200
6,021,372 A * 2/2000 Harrington .................. 701/209
6,031,104 A * 2/2000 Heinemann et al. ...... 546/268.7
6,202,022 B1   3/2001 Ando
6,298,303 B1  10/2001 Khavakh et al.
6,401,034 B1 * 6/2002 Kaplan et al. ............... 701/209
6,614,363 B1 * 9/2003 Behr et al. ............. 340/995.19
2003/0093217 A1 * 5/2003 Petzold et al. ............... 701/201

FOREIGN PATENT DOCUMENTS

| DE | 199 08 941 | 9/2000 |
|---|---|---|
| EP | 0 785 535 | 7/1997 |
| WO | WO 01/65518 | 9/2001 |

* cited by examiner

*Primary Examiner*—Tan Q. Nguyen
(74) *Attorney, Agent, or Firm*—Buchanan Ingersoll & Rooney PC

(57) ABSTRACT

A route calculation method allowing an optimized route to be drawn up by means of a calculator between a point $\alpha$ and a point $\beta$, consisting in using digitized data from at least a first and a second source, and consisting of (i) determining a plurality of alpha nodes ($N\alpha$), referenced in both the first and the second sources, and determining a first optimization value for each of the nodes; (ii) determining a plurality of beta nodes ($N\beta$), referenced in both the third and the second sources, and determining a first optimization value for each of the nodes; (iii) determining, for all the pairs of nodes $N\alpha$ and $N\beta$, a second optimization value for each of the pairs of nodes ($N\alpha$, $N\beta$); (iv) determining, for the set of alpha-beta route, the optimum nodes between the points alpha and beta. The invention also relates to a device allowing implementation of the present method.

12 Claims, 9 Drawing Sheets

Alpha sector (source 1)

Beta sector (source 1 or 3)

Sector N-N (source 2)

Alpha sector (source 1)

Beta sector (source 1 or 3)

ROUTE DETERMINATION METHOD AND DEVICE

This application is a continuation of PCT/EP02/14396 filed on Dec. 17, 2002 and which claims priority under 35 U.S.C. § 119 to patent application Ser. No. 01/16627 filed in France on Dec. 17, 2001.

BACKGROUND OF THE INVENTION

The present invention concerns a route calculation method allowing optimisation of the drawing-up of routes and/or of the representation thereof in the form of instructions by using a plurality of reference sources.

These days, various route calculation methods are well known, as are several types of associated device. Two types of complementary technology have allowed these tools to become very widespread. Firstly, there are on-board devices, which allow a driver to direct his/her vehicle to a given location following the directions shown on the screen. Such devices are often associated with GPS equipment, thereby additionally allowing more or less precise location of the vehicle and completion of the route from this point. Some versions also exist for use on a personal computer.

On the other hand, centralised devices offer to a large number of potential users a frequently extensive and varied range of possibilities accessible for example through a network such as the Internet. Centralised devices exhibit the advantage of a minimal utilisation cost for each user, with the possibility of regular data updates (without additional cost to the user). In addition to route calculation, providers often also offer related services, such as traffic forecasts/recommendations, tourist information, etc.

Since these types of service have been in existence, the range has never stopped broadening, but most of the time the improvements relate to related aspects and not to the technology allowing route calculation as such. As the equipment has become steadily more powerful, so considerable progress has been made in optimising operating times, improving result presentation etc. Route calculation principles have, for their part, developed less and thus exhibit a certain number of limitations which are sometimes in danger of affecting the quality of the routes produced. For example, the methods and devices of the known type use a single source of geographical data to draw up a route. As a function of the density and quality of the information provided by said source and the frequency with which it is updated, routes may be more or less precisely drawn up, with a variable degree of reliability.

For example, a large proportion of the routes to be drawn up have a starting point in a given urban area and include an urban journey in said area, a route portion in an interurban area and a destination again in an urban area. If such a route is found on the basis of a single data source, a source of the "large scale" type will be used by default, in order to obtain the necessary precision in the urban area. If the route is provided in the form of a list of instructions, the urban journey portion may be highly detailed, stating for example at which moment to turn left or right, for what distance to continue on the same road etc.

Such precision is not required and indeed is not desirable for a route in an interurban area. In fact, when travelling along a fast road, such as a main road or a motorway for example, the driver is more able to respond to instructions taking the form of roads to take, directions to follow, etc. It is difficult, in fact, to respond at high speed, and/or on long journeys, to instructions of the type "turn left, continue straight on for 100 m and turn right". However, such instructions are typical of a source corresponding to a large scale map, which corresponds in general to an urban area, rich in all kinds of detail.

Likewise, if the route is indicated in the form of a line on a map, it is also difficult to work out where one is if too many irrelevant details are provided. Finally, the route plan provided tends to be long, making it difficult to use.

To remedy these disadvantages, route calculation methods are often used which comprise concatenating or simplifying steps, with the purpose of presenting the user with fewer superfluous details, so as to make the route more readily comprehensible. Such methods are still not entirely satisfactory, however.

Consequently, the present invention provides a method of route calculation which allows an optimised route between a point $\alpha$ and a second point $\beta$ to be drawn up by means of a calculator as a function of at least one criterion CO, said method comprising the use of digitised, in particular geographical, data from at least a first and a second source stored on at least one storage medium and comprising a set of common nodes, the second source differing from the first by at least one characteristic K, and comprising the following steps:

a) determining, on the basis of the point alpha and said first source, a plurality of alpha nodes ($N\alpha$), substantially adjacent said point alpha, referenced in both the first and the second sources, and determining a first optimisation value for each of the nodes as a function of the data from the first source and a given criterion CO;

b) determining, on the basis of the point beta and a third source, a plurality of beta nodes ($N\beta$), substantially adjacent said point beta, referenced in both the third and the second sources, and determining a first optimisation value for each of the nodes as a function of the data from the third source and a given criterion CO;

c) determining, on the basis of the data from the second source and a given criterion CO, for all the pairs of nodes $N\alpha$ and $N\beta$, a second optimisation value for each of the pairs of nodes ($N\alpha$, $N\beta$);

d) determining, for the set of alpha-beta route, the optimum nodes allowing optimisation of an overall route from the point alpha to the point beta.

The order in which these different steps are performed may vary depending on the embodiment.

The characteristic K which distinguishes the sources is preferably a function of the information contained in each of the sources (such as for example a scale different from the first source, a database of different format from the format of the first source, etc). Thus, for example, the first source may be of the urban type and/or the second source may be of the interurban type and/or the third source may be of the urban type.

Such a configuration allows both real optimisation of the drawing up of routes and clear, precise and logical presentation of the result. Thus, for example, in the case of a route including urban journey portions and interurban journey portions, the method according to the invention allows reference to be made to an optimum source for each of the journey portions. Thus, for example, reference may be made to a high density source, i.e. comprising a large number of details, for an urban journey portion. As soon as the type of environment changes, for example to an interurban journey portion, reference is made to another source, or a source complementary to the first. Reference is made, for example, to a source of the "small scale" type, typical for drawing up routes over long interurban journeys. Only the essential details appear. The instructions given to the user (often the driver of a vehicle) are simple and devoid of any details which might cause confusion. In the case of written or encoded instructions, it is easy to adapt the type of instruction to the type of journey. For example in a town the indications of the path to follow may be very detailed, such as "turn left, continue straight ahead for 320 m, then turn right, etc." On a motorway, or fast road, the indications may be of the type "take road # 260a, in the direction of ABC". The resultant route plan is thus substantially concise, in particular as far as the interurban journey portion is concerned.

On the other hand, use of sources of different origins and/or types may allow operations to be performed using the data from each source which are most appropriate to the individual case, for example the most precise data, the most up-to-date data, the most reliable data, the best quality data, etc.

It should, moreover, be noted that it becomes possible to process or maintain autonomously the different sources used, for example with the aim of ensuring that they complement one another. Thus, for example, it is possible to concentrate or maximise maintenance and updating efforts for a source which contains data on the main road network, attracting a major proportion of the traffic.

It is also more easily possible to provide complete routes, that is to say without leaving out one or more journey portions. If a source is available which contains data relating to urban centers, without links between these centers, it is possible, by means of the invention, to refer to a second source providing connections between the centers and thus to draw up a full route, from center to center.

Being able to use sources well suited to each different portion of a given route allows considerable simplification of the process. In contrast to certain current techniques with which complex routes are drawn up from single complex, dense sources, the result obtained being simplified at the end of the process so as to render it more practical and user-friendly, the method according to the invention allows simplification to be effected from the outset, that is to say as an integral part of the source used. This takes the form, for example, of avoiding reference being made needlessly to an excessively complex or excessively detailed source for a given journey portion.

In said method, steps c and d are, preferably, performed in succession once steps a and b have been completed.

Advantageously, the first source is of the urban type, the second source is of the interurban type and the third source is of the urban type. The first and second optimisation values of said nodes (Nα, Nβ) are preferably determined on the basis of an algorithm derived from DIJKSTRA.

According to one advantageous example of embodiment, the point α is for example the starting point of the route, and/or the point β may be for example the destination of the route. Advantageously, the third source corresponds substantially to the first source, or the third source corresponds substantially to a limited sector of the first source.

According to one advantageous embodiment, said set of common nodes results from a previous matching step, in which certain nodes identified in more than one source were linked together.

According to one advantageous example of embodiment, the alpha node corresponds to the point alpha. According to another advantageous example of embodiment, the beta node corresponds to the point beta.

According to various variants, the DIJKSTRA algorithm is refined or simplified or optimised by incorporating other technical elements such as those developed by GONDRAN and MINOUX.

The optimisation value CO of a node or a route is advantageously established as a function of at least one criterion CRI. The criteria CRI may be pre-established, or selected by the user from a pre-established list, or defined by the user. The data concerning the route as drawn up are advantageously presented to a user in the form of a list of coded, in particular written instructions. According to one variant embodiment, the data relating to the route as drawn up are presented to a user in the form of a geographical representation, in particular a road map, on which the route is highlighted.

The present invention also provides a device for implementing the method presented above, comprising:

at least one storage unit, allowing access to data from the first and second sources;

at least one calculating unit, allowing the generation of an optimised route;

at least one display means, allowing the optimised route to be presented to the user;

implementation instructions, allowing said method to be executed.

Advantageously, the storage unit is capable of cooperating with detachable storage means, such as a CD-ROM or DVD-ROM etc.

SUMMARY OF THE INVENTION

According to one advantageous embodiment, the device is intended for use on board a motor vehicle.

According to another advantageous embodiment, the storage and calculation units are centralised and allow a number of decentralised peripheral stations to access optimised routes drawn up according to said method. For example, decentralised stations are capable of being connected to the centralised unit via a network, in particular a global network.

The present invention also provides a computer system comprising a device such as previously described.

The present invention also provides software comprising programmed code elements for implementing the above-described method, when said software is loaded onto a computer system and executed by said computer system.

The present invention also provides software in the form of a product recorded on a medium readable by a computer system, comprising programmed code elements as stated above.

DESCRIPTION OF THE DRAWINGS

All practical details are given in the following description, supplemented by FIGS. 1 to 9, in which:

in FIG. 3, the nodes appear in a typical representation of the urban type; in FIG. 4, the nodes appear in a typical representation of the interurban type, thereby illustrating the correspondence or crossover zone between the two sources used to draw up a route;

FIG. 6 showing all the nodes within a given radius (of Paris); FIG. 7 showing the nodes within a radius, with priority being given to the direction of the destination (Toulouse);

DESCRIPTION OF PREFERRED EMBODIMENTS

In the present description, the following terms are used in particular with the following meanings:

a "node" is a point of intersection between a first cartographic or road (or other) network element and a second element of such a network, in particular the intersection between a plurality of roadways. A node also denotes a point of physical or qualitative change of a section of road, such as for example a changeover from two to three lanes, a change in speed limit, a zone (even temporary) subject to roadworks, a breaking-off point such as a frontier, etc.;

a "section" is a portion of roadway between two nodes.

According to a preferred embodiment of the invention, the route calculation method allows an optimised route to be drawn up as a function of at least one criterion CO between a point α and a point β, using the data, in particular geographical but optionally of other types such as tourist or traffic information, timetables, recommendations or advice etc., from at least two different sources. The distinguishing factor "K" between the two sources may stem from different types of elements. According to a first example, it stems from the type of geographical data involved. It may thus be a source of the urban type, which then comprises relatively detailed and precise data about the road networks, place names etc., a little like a detailed map of a town or a conurbation, which would be classified as large scale in the case of a paper edition of such a map. It may on the other hand be a source of the interurban type, which then comprises data based in particular on the road network allowing journeys to be made of considerable length, such as for example journeys via major roads passing through a town or part of a town, an interurban journey on main roads or motorways etc., in particular if the journey is one of several ten or hundred kilometres. These data then resemble a map of a region, a province, a canton, or even one or more countries, which would be classified as small scale in the case of a paper map. For such an example, the characteristic K resembles a difference "of scale" or of density of information, or of geographical coverage, etc.

The source of the distinction may also stem from the source type. For example, a source of geographical data, another of geological, or climatic, or geophysical data etc. The characteristic K then corresponds to the main type of data from a source.

Figure 1:
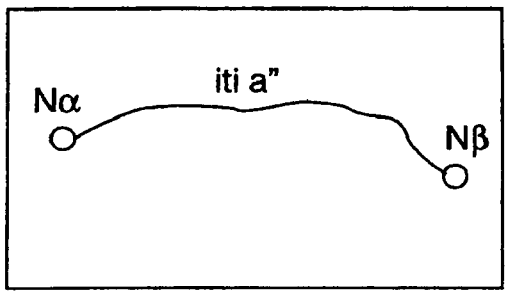
FIGS. 1 and 2 are schematic representations of a starting point and a destination point of a route, illustrating the nodes allowing changeover from a first to a second source of data for optimised calculation of an overall route according to the invention.
Figure 1:
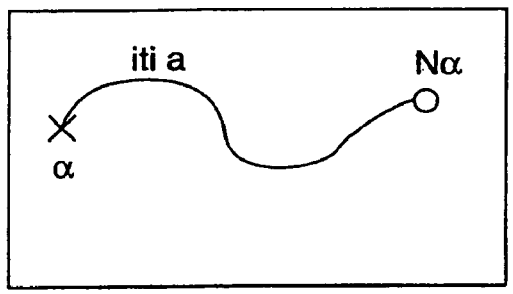
Figure 1:
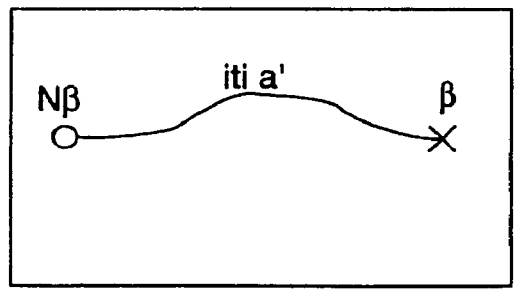
Figure 2:
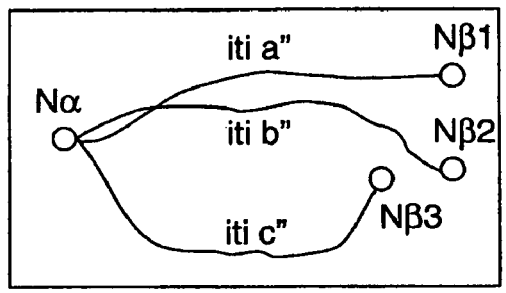
Figure 2:
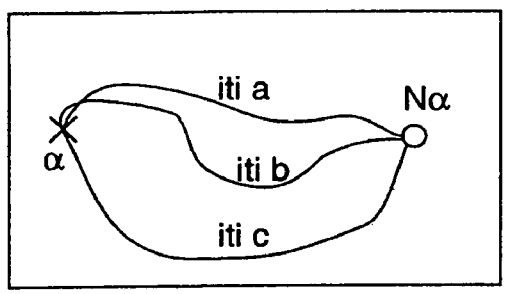
Figure 2:
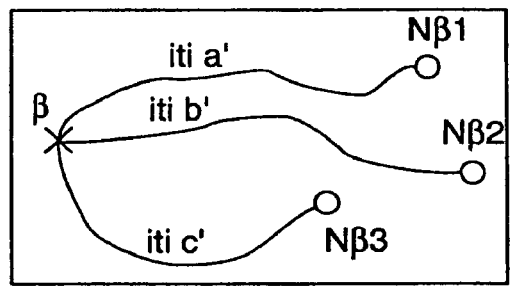

According to one particularly advantageous example of embodiment illustrated in FIGS. 1 and 2, two or more complementary geographical sources are used, with the aim of optimising the process of determining or "making" a route principally on roads but possibly also including pedestrian or rail or maritime sections (by ferry for example). A route of the "intermodal" type may also be drawn up. Such a route may comprise, for example, various portions using different modes of transport such as buses, trains, aeroplanes, boats, cars, walking etc.

The two or more sources preferably comprise an overlap zone or common zone or interface zone. Such a zone advantageously allows a form of continuity or of connection between the sources. For example, in a first source, of the urban type, there is a point α, which could correspond to a motorway slip-road, close to an urban zone. In a second source, of the interurban type, the same point α may advantageously be found, still corresponding to the same motorway slip-road. The same point α means in the present context that each source has a code for identifying one and the same physical or geographical fact in the real world.

In practice, this same point α may be represented by one and the same code in each of the sources. This case then allows simple management, since the point a located on the basis of one source may easily be identified or located in another source. On the other hand, the point α may be represented by different codes. It is then desirable to have links between the "different" points α from the different sources, in order to be able to pass easily from one to the other. The links are either integrated into one of the sources or they are integrated into an independent source. It is thus possible to have a base of links between two or more sources, to which reference is made in addition to the sources themselves.

Furthermore, it is possible for a point α to be identified in one source by a given form and a given position which are not necessarily the same in another source. The links or link source then preferably comprise twinning elements, which allow a point from one source to be assimilated with a similar point in another source (for one and the same geographical or physical fact) and ensure changeover from one source to another where possible without interference or discontinuity. This changeover is often designated "matching".

Figure 8:
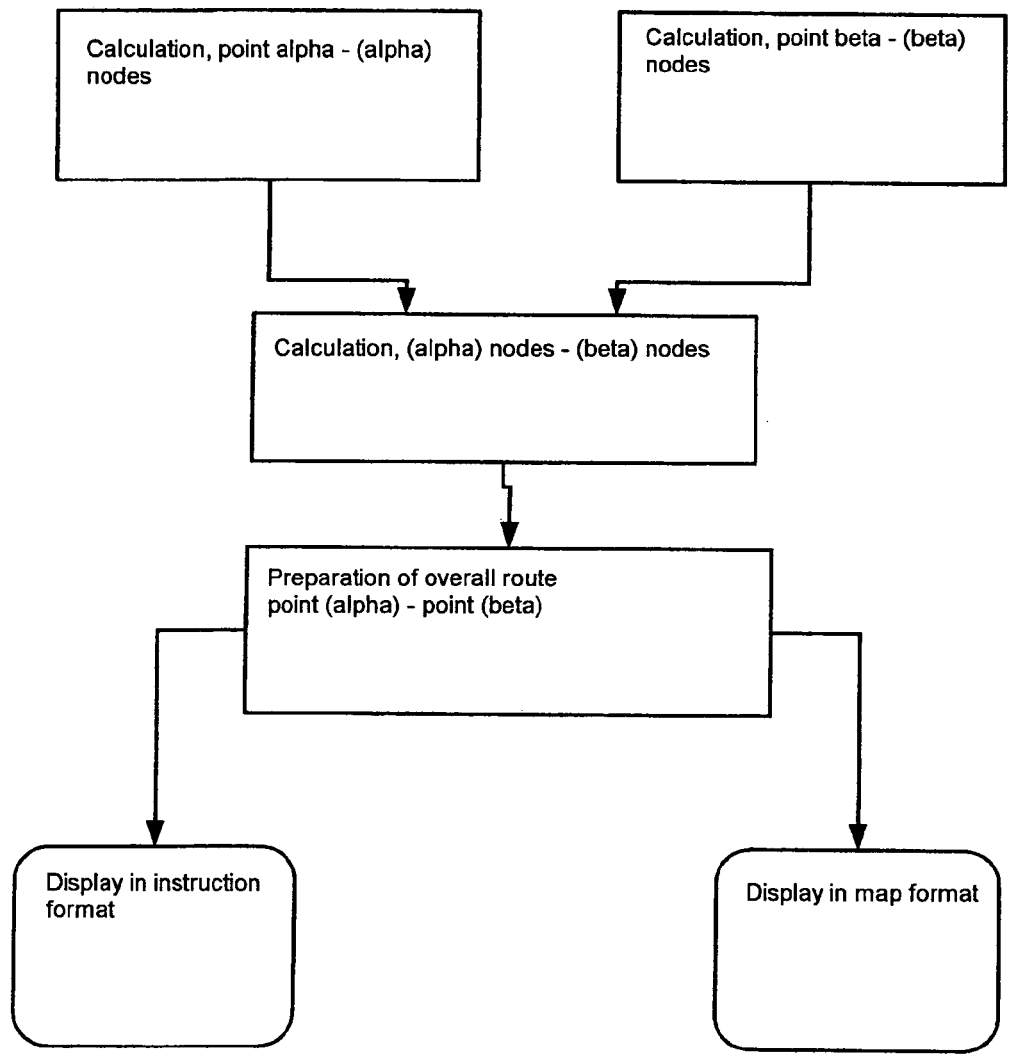
FIG. 8 illustrates the main steps enabling preparation of an optimum route between the points alpha and beta, using the proposed method.

According to the invention, and as illustrated for example in FIGS. 1, 2 and 8, the point alpha and the first source are used to determine one or more alpha nodes (Nα). These nodes are preferably in the same sector as the point alpha (α). According to a particular example, the point alpha corresponds substantially to a node. The selected nodes may be located or identified on the basis of the first or second source, either, as explained above, by being referenced in the two sources or thanks to a link allowing an interface or link to be established between the two sources.

A value or cost is preferably determined for each of the identified nodes as a function of a given criterion CO. This criterion will be commented on later in the present description.

The number of nodes located in the surrounding area or sector of the point alpha may be fixed in accordance with various approaches. According to one advantageous example of embodiment, only the nodes identified without passing through a first node already identified are adopted or kept. According to this approach, the nodes disposed in the immediate vicinity of the point alpha are optimised, the others being automatically disposed of.

According to another advantageous approach, a given number of nodes is adopted, for example 10 or 15 or 30, distributed over the sector of the point alpha. According to another advantageous approach, the nodes situated within a given geographical limit linked to the alpha sector are adopted, such as for example the nodes situated within a radius of 10 or 20 or 50 km around the point alpha.

According to one or other of these modes, it is also possible to adopt the points of the alpha sector situated preferably in a given direction.

Then, as illustrated in FIGS. 1, 2 and 8, the same process is performed for the point beta, to obtain a plurality of beta nodes (Nβ), in the beta sector (β). The beta nodes are preferably referenced in both a third and the second sources. The third source may for example be an urban source corresponding to the sector where the point beta is situated. The third source may take a different form, as stated above. Then preferably, as for the alpha nodes, a value is determined for the beta nodes.

According to one variant embodiment, the third source corresponds substantially to the first source, or alternatively to a particular sector of the first source.

Figure 3:
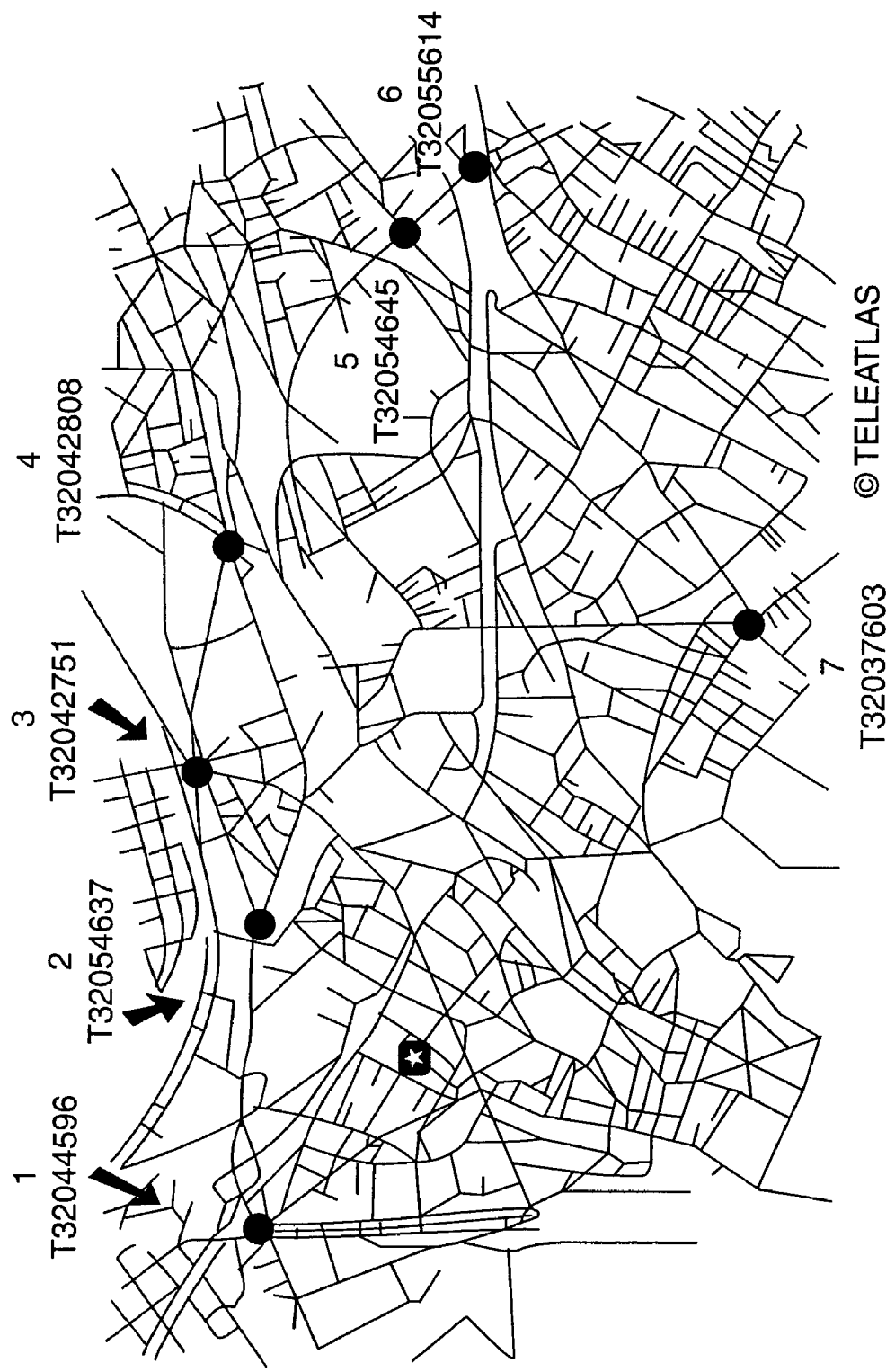
FIGS. 3 and 4 are schematic representations of a series of nodes determined on the basis of a given starting point.
Figure 4:
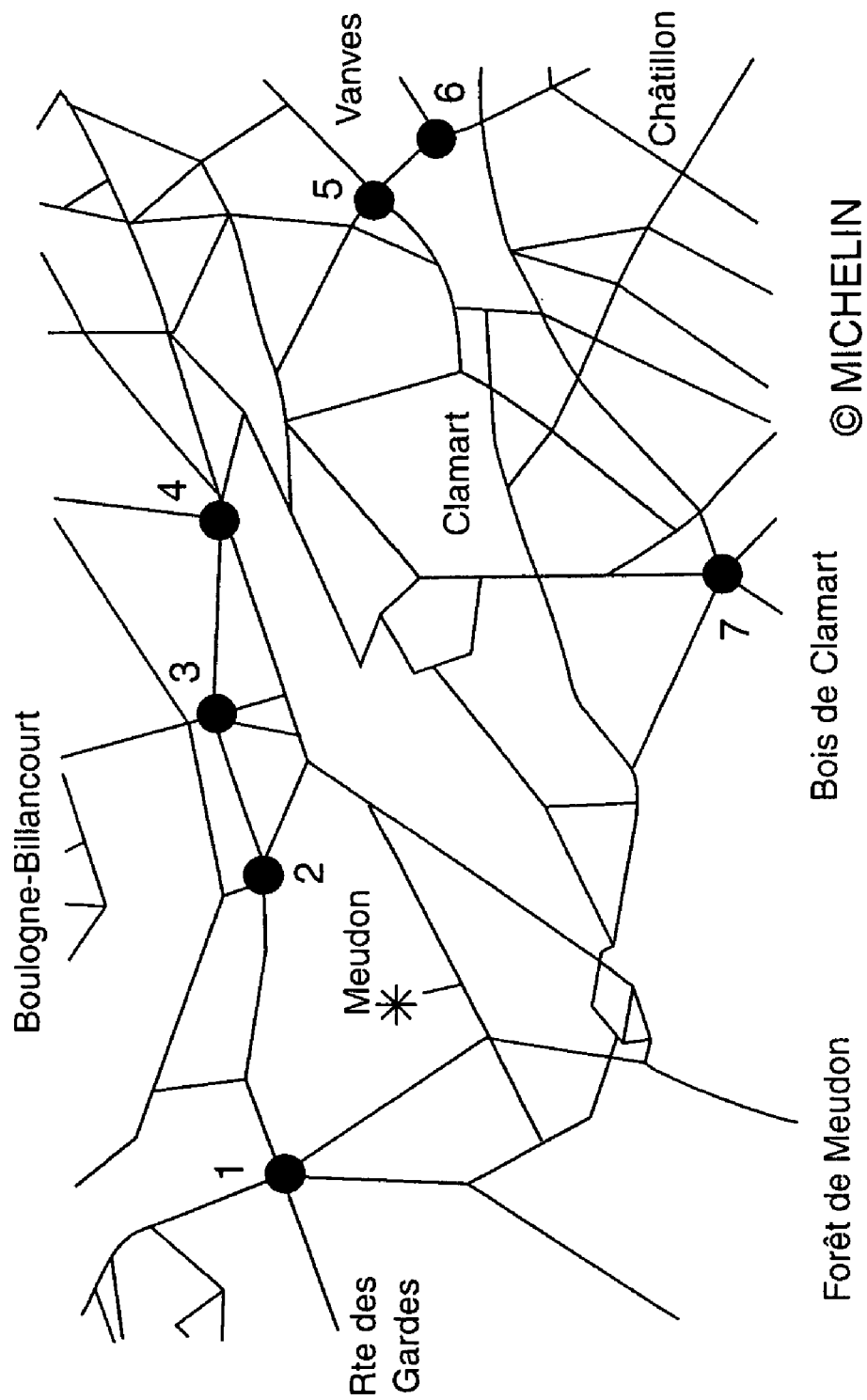

A plurality of alpha nodes and a plurality of beta nodes are then available (see FIG. 2). FIGS. 3 and 4 and Table A below illustrate examples of alpha or beta nodes common to a first source (FIG. 3) of the urban or large scale type and to a second source (FIG. 4) of the interurban or small scale type.

TABLE A

| Value (Time) | Node Id | | |
|---|---|---|---|
| 0:00 | * | Av. de la Paix | Meudon |
| 2:54 | 1 | Pl. du Mal Leclerc | Meudon |
| 5:45 | 2 | Vaugirard | Meudon |
| 6:27 | 3 | Pl. de la Résistance | Issy-les-Moulineaux |
| 7:03 | 4 | Pl. Léon Blum | Issy-les-Moulineaux |
| 8:22 | 5 | Pl. Marquis | Clamart |
| 11:30 | 6 | Av. Paix & Av. G. Gaule | Vanves |
| 12:09 | 7 | Pl. du Clos Montholon | Vanves |

In this example, the large scale source is obtained from TELEATLAS data, while the small scale source is obtained from a MICHELIN source (MICHELIN Europe base). Table A gives details of each of the nodes (for example alpha or beta nodes) determined from a starting point (or destination) *. In this example, the values given to each node correspond to the journey time from the starting point to the node in question. In this same example, the nodes 1 to 7 are located or determined and a value is preferably attributed to each one, as shown in the Table.

The starting point for this example is situated at Meudon (France) avenue de la Paix, identified by an *. The value of this point is advantageously zero. Each of the other nodes has a different value, as a function, for this example, of a substantially average journey time between the point * and the node. Other value types may be attributed as a function of other single or multiple criteria, as described below.

The alpha nodes have a value relative to the point alpha; the beta nodes have a value relative to the point beta.

A second value is then advantageously established for each node, starting preferably from the sector identified as being the starting sector, and travelling gradually towards the other sector (destination sector). A value is determined for each of the nodes, designated here by the value N—N (node to node value). This is effected in relation to the second source, which serves as a reference for establishing said values.

Proceeding in this manner, the nodes close to the starting point have a "low" value while the nodes close to the destination sector have a "high" value. The DIJKSTRA method or algorithm is advantageously used (being well known in the field of route determining or determining the shortest path) to establish the values on the one hand and to redraw the resultant route on the other hand. Node determination according to this method is presented further on in the description and illustrated in FIGS. 6 and 7.

The resultant route preferably corresponds to that passing through the nodes which have allowed the best possible value to be achieved for a node in the destination sector. In general, this is the node having the lowest value. According to another method of establishing values, it may also be the highest value. This node is designated the "selected node".

According to a preferred embodiment of the invention, the optimum value, for each sector, is established by considering on the one hand the value of the alpha or beta sector, established for example at the start of the process, and on the other hand the node to node sector value, corresponding for example to an interurban sector. Thus, for the destination sector beta, the values N—N and the beta sector values are added up for each node. The node with the optimum resultant overall value is preferably used. The same is done for the starting sector, by combining the values of the alpha sector with those of the sector N—N. The node with the optimum value is selected.

The resultant overall route passes through the selected nodes of the starting and destination sectors, as well as all the nodes of the sector N—N which have allowed optimisation of the values.

According to one variant embodiment, the starting point is the point beta, and the destination point is the point alpha.

According to another variant embodiment, the value of at least one of the nodes selected from the alpha and/or beta sectors is not taken into consideration in drawing up the overall route. In such a case, priority is given to the node to node route portion.

According to another variant, an alpha route is drawn up from the point alpha to an alpha node which may or may not be optimised, the same being done for a beta route from the point beta to a beta node, and a node to node route is drawn up for the sector N—N.

An optimised route is thus obtained only over a section of the journey, or the route is not optimised at all. However, the method comprises various steps in which reference is made to at least two different sources. It is possible, in effect, for the need for optimisation to be secondary for certain types of route, or for the user to be left to choose between a plurality of non-optimised routes.

According to a preferred embodiment of the invention, the information relating to the route drawn up are presented to a user in the form of a list of coded, in particular written, instructions, as illustrated in Table B below.

TABLE B

List of instructions (route plan):

Departure, step by step:
Start from Av. de la Paix
Turn right along Rue des Bigots for 115 m
Turn left along Rue des Jardies for 130 m
Turn right into Place Stalingrad for 25 m
Turn right into Boulevard Verd de Saint-Julien for 415 m
Turn left into Place du Maréchal Leclerc for 80 m
Take Route des Gardes for 515 m
Take Route du Pavé des Gardes for 1050 m
Journey:

Take N118 towards Orléans for 1.4 km
Take exit 3, Meudon-la-Forêt
Vélizy "Zone d'emplois"
Regional shopping center
Vélizy-Villacoublay for 2.8 km The first part of the instructions (top part) corresponds substantially to the urban portion of the route. The details given are very precise and allow the vehicle to be easily directed even through a very dense road network.

This Table illustrates an example which may give or transmit instructions to the user. A large number of other methods may also be used. Thus, for example, it is possible to specify the journey time for a section or between two indicated road changes. It is also possible to use symbols or pictograms, such as arrows etc. According to another variant, it is possible to transmit directions to the driver, en route, in his/her vehicle, by means of a speech synthesis device.

The bottom part of Table B illustrates the journey portion of the interurban or "small scale" type. The instructions given are advantageously more succinct and take the form, for example, of directions to follow, road numbers (or names), exit numbers (or names) etc. The instructions given advantageously take into account the indications on road signs which the driver may observe and follow once he/she has arrived at the appropriate point with the vehicle.

Figure 5:
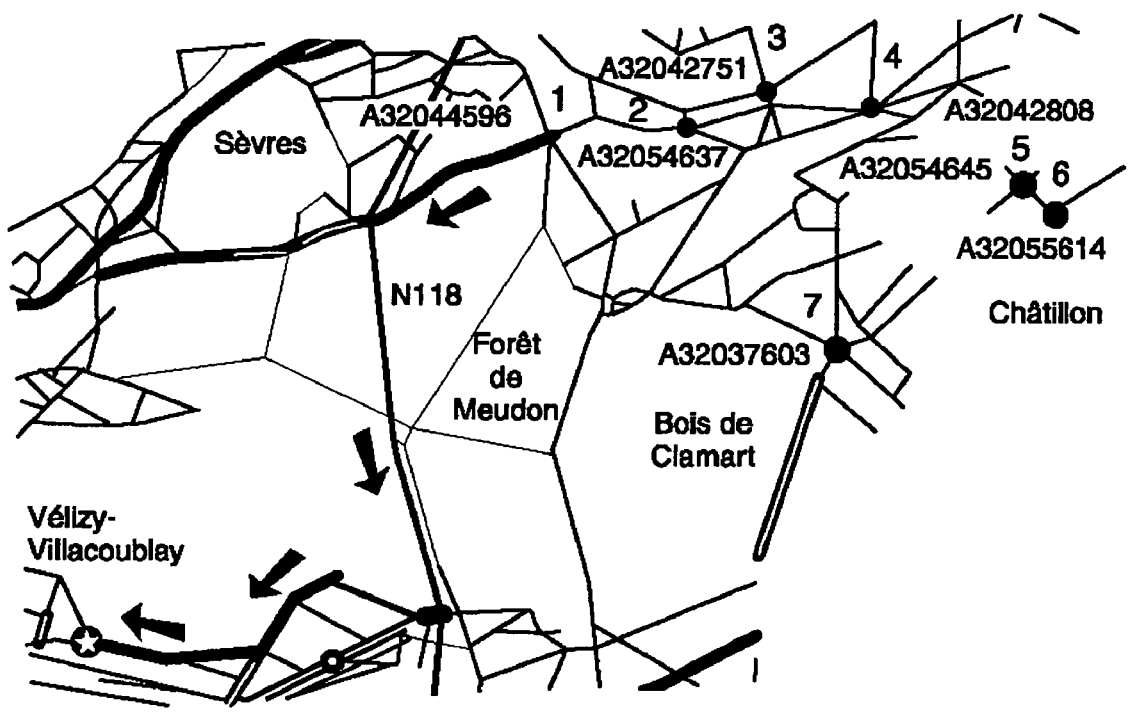
FIG. 5 shows how a route is found from Meudon to Vélizy starting from one or other of the seven potential nodes in the picture in FIG. 5.

The example in FIG. 8 is drawn up from the same starting point as in FIGS. 3 and 4, with Vélizy-Villacoublay as the destination. The node 1 is selected within the starting sector (alpha sector). The selected route is indicated by bold lines and arrows in FIG. 5.

According to one variant embodiment, the information relating to the route as drawn up are presented to a user in the form of a geographical representation, in particular a road map, on which the route is highlighted.

The optimisation criterion CO makes it possible to define or assign the mode of allocation of the values according to certain choices. This optimisation value CO of a node or a route is established as a function of at least one criterion CRI. According to one embodiment, the criteria CRI are pre-established, and may be selected by the user from a list, for example. Here are some particularly advantageous examples of criteria CRI which the user may consider when determining a route:

determining the substantially shortest route between alpha and beta;
determining the substantially fastest route between alpha and beta;
determining the route which provides a compromise between distance and time;
determining the route which essentially gives priority to use of the motorway between alpha and beta;
determining the route which essentially avoids use of the motorway between alpha and beta;
determining the substantially cheapest route with regard to tolls;
determining the most pleasant route;
determining the essentially least busy route;
determining a route which does not go outside the borders of a given country, for example;
determining a route which passes at least one desired point (such as a hotel, restaurant, filling station or service station, tourist site, etc.).

The criterion CO may thus advantageously take account of a plurality of elements, optionally weighting the importance of each of them.

According to another embodiment, the criteria CRI are defined by the user. The criteria may resemble those already listed by way of example, or comprise other types of criteria, which may be more individually tailored.

Figure 6:
FIGS. 6 and 7 illustrate an example of the interurban portion of a route, with the nodes which served to draw up said route.
Figure 7:
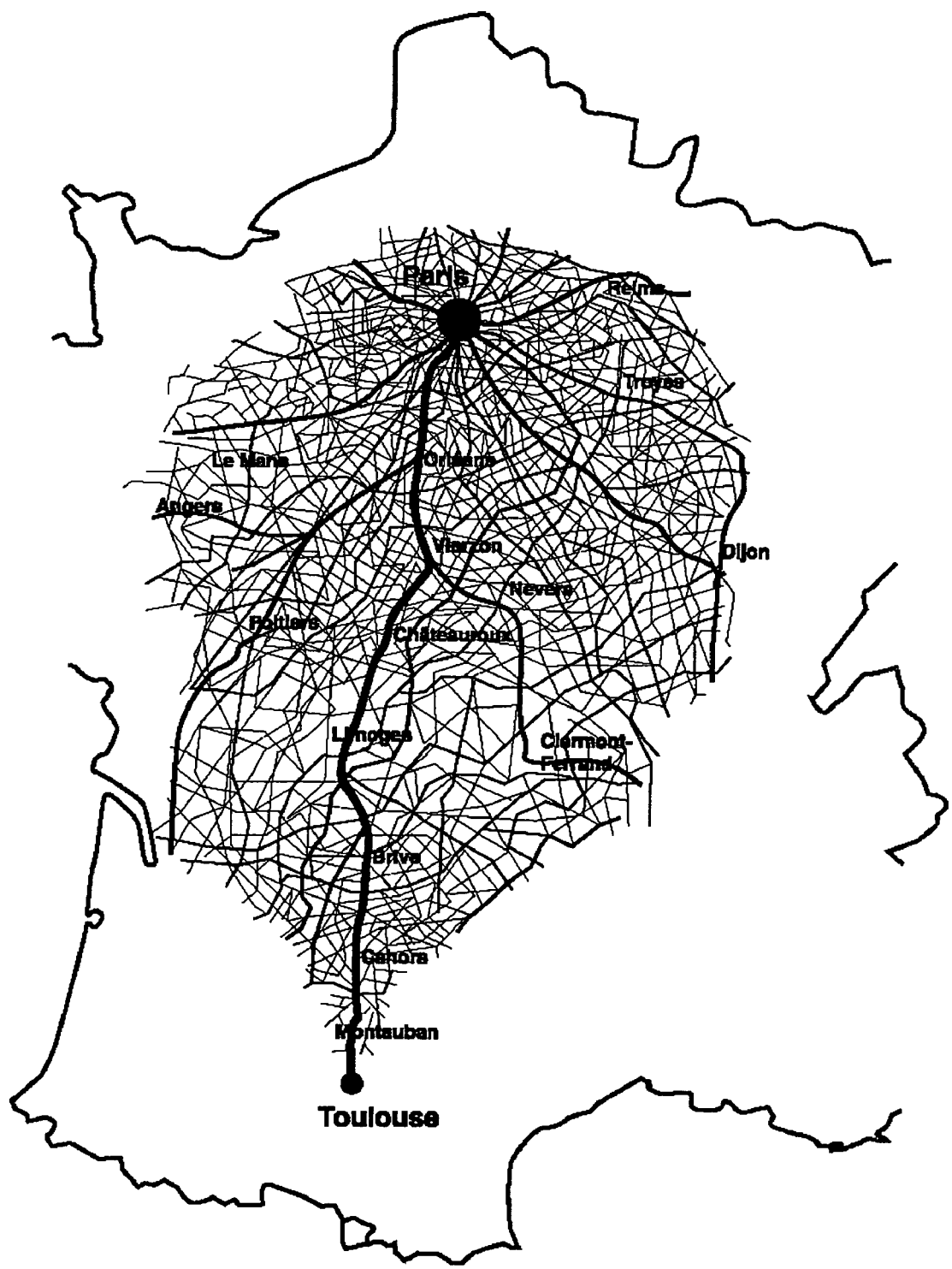

FIGS. 6 and 7 illustrate examples of embodiment of a route (for an interurban journey portion, on the basis of an interurban-type source) based on tools using the DIJKSTRA algorithm, preferably modified. In FIG. 6, for a route from Paris to Toulouse, nodes are determined from the starting point, in the region of Paris, in all potential directions. When the nodes situated in the destination sector (Toulouse) have been determined, and a value has been assigned to each node, it is possible to select the optimum starting and destination nodes. The resultant route, as illustrated, passes through the nodes which have allowed the optimum nodes to be obtained.

FIG. 7 illustrates a variant according to the which the nodes are determined by giving priority to the direction towards the destination sector. The nodes determined then form a kind of "drop of water", oriented towards the destination point. If a new node does not allow the value between this node and the destination point to be optimised relative to other nodes which are already known, it is preferably not adopted.

Figure 9:
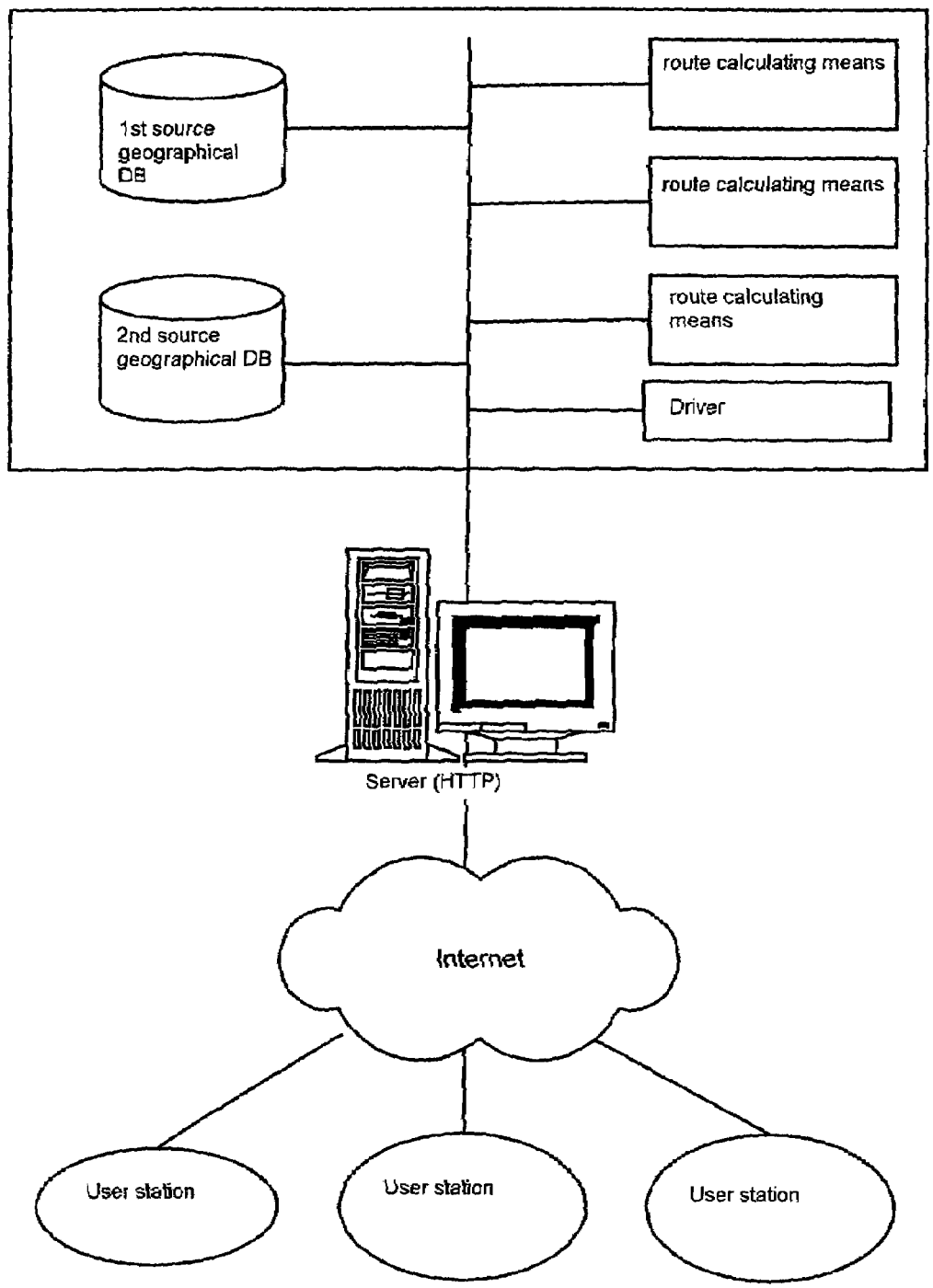
FIG. 9 illustrates an exemplary configuration of the equipment used for a route calculation system of the centralised type, accessible by public network.

FIG. 9 illustrates an example of equipment suitable for use for the purposes of the invention. One or more databases DB contain the geographical data from the various sources. One or more calculation means enable performance of the operations required to draw up routes. A driver is advantageously used to synchronise operations. A server allows the centralised system to be connected to a plurality of users via a network, such as the Internet for example.

According to various advantageous variants, the method according to the invention may also be used with other starting data than the nodes alone. For example, it is possible to use nodes and/or oriented sections.

What is claimed is:

1. A route calculation method allowing an optimised route to be drawn up by means of a calculator as a function of at least one criterion CO between a starting point $\alpha$ and a destination point $\beta$, comprising the use of digitised data from at least a first and a second source stored on at least one storage medium and comprising a set of common nodes, the second source differing from the first by at least one characteristic K, each of the at least first and second sources comprising geographical data, the method comprising the following steps:
   a) searching, from the starting point alpha and from geographical data in said first source, a plurality of alpha nodes (N$\alpha$), substantially adjacent said starting point alpha, referenced in both the first and the second sources, and calculating, using a route calculation algorithm, from the starting point alpha, an optimisation value for each of the nodes as a function of the data from the first source and the given criterion CO;
   b) searching, from the destination point beta and from geographical data in a third source, a plurality of beta nodes (N$\beta$), substantially adjacent said destination point beta, referenced in both the third and the second sources, and calculating, using a route calculation algorithm, an optimisation value for each of the beta nodes as a function of the data from the third source and the given criterion CO;
   c) calculating, using a route calculation algorithm, from the data from the second source and the given criterion CO, for all the pairs of nodes N$\alpha$ and N$\beta$, an optimisation value for each of the pairs of nodes (N$\alpha$, N$\beta$); and
   d) determining, solely by calculation on the basis of the optimisation values from steps a, b, and c, the optimum nodes establishing an optimised overall route from the starting point alpha to the destination point beta, wherein the entire optimised overall route between the starting point and the destination point is calculated during step d.

2. A route calculation method according to claim 1, in which the characteristic K distinguishing the sources is a function of the information contained in each of the sources.

3. A route calculation method according to claim 1, in which steps c and d are performed in succession once steps a and b have been completed.

4. A route calculation method according to claim 1, in which the first source is of the urban geographical type and the second source is of the interurban geographical type.

5. A route calculation method according to claim 1, in which the third source is of the urban geographical type.

6. A route calculation method according to claim 1, in which said set of common nodes results when certain nodes identified in more than one source have been linked together.

7. A route calculation method according to claim 1, in which the third source corresponds substantially to the first source.

8. A route calculation method according to claim 1, in which the third source corresponds substantially to a limited sector of the first source.

9. A route calculation method according to claim 1, in which the alpha node corresponds to the starting point alpha.

10. A route calculation method according to claim 1, in which the beta node corresponds to the destination point beta.

11. A route calculation method according to claim 1, in which the optimisation value CO of a node or a route is established as a function of at least one criterion CRI.

12. A route calculation method according to claim 1, in which each said route calculation algorithm is derived from DIJKSTRA.

* * * * *